US012654320B2

(12) United States Patent　　　(10) Patent No.:　US 12,654,320 B2
Shah et al.　　　　　　　　　　　(45) Date of Patent:　　Jun. 16, 2026

(54) LEARNING ABSTRACTIONS FOR MULTI-ROBOT PATH PLANNING IN UNSTRUCTURED ENVIRONMENTS

(71) Applicant: Toyota Motor Engineering & Manufacturing North America, Inc., Plano, TX (US)

(72) Inventors: Naman P. Shah, Tempe, AZ (US); Georgios Fainekos, Novi, MI (US); Bardh Hoxha, Canton, MI (US); Hideki Okamoto, Ann Arbor, MI (US); Danil V. Prokhorov, Canton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 153 days.

(21) Appl. No.: 18/614,355

(22) Filed: Mar. 22, 2024

(65) Prior Publication Data

US 2025/0121500 A1　　Apr. 17, 2025

Related U.S. Application Data

(60) Provisional application No. 63/590,252, filed on Oct. 13, 2023.

(51) Int. Cl.
B25J 9/16　　　　　(2006.01)
(52) U.S. Cl.
CPC ............. B25J 9/1664 (2013.01); B25J 9/161 (2013.01)
(58) Field of Classification Search
CPC ................................. B25J 9/1664; B25J 9/161

USPC ................ 700/245–264; 318/568.11–568.25
See application file for complete search history.

(56) References Cited

U.S. PATENT DOCUMENTS

| 10,606,269 | B2 * | 3/2020 | Millard | ................ | G05D 1/0246 |
| 10,809,734 | B2 * | 10/2020 | De Castro | ............ | G05D 1/0248 |
| 10,845,821 | B2 * | 11/2020 | Canoso | ................ | G05D 1/0212 |
| 11,650,591 | B1 * | 5/2023 | Millard | ............. | G01C 21/3807 |
| | | | | | 700/255 |

(Continued)

FOREIGN PATENT DOCUMENTS

| JP | 2021501380 | A | 1/2021 |
| TW | I804220 | B | 6/2023 |
| WO | 2019234702 | A2 | 12/2019 |

OTHER PUBLICATIONS

LaValle, "Rapidly-exploring random trees: A new tool for path planning", Research Report 9811 (1998).

(Continued)

*Primary Examiner* — Jaime Figueroa
(74) *Attorney, Agent, or Firm* — Jordan IP Law, LLC

(57)　　　　ABSTRACT

A computing system may include a processor. The computing system may include a memory having a set of instructions, which when executed by the processor, cause the computing system to determine paths in an abstract state for a first robot to progress from an origin to a destination, determine a cost for each respective path of the paths based on a congestion measurement of the respective path and a measurement of the abstract state, select a selected path from the paths that is associated with a lowest cost from the costs, and compute a motion plan for the first robot to traverse the selected path.

20 Claims, 13 Drawing Sheets
(6 of 13 Drawing Sheet(s) Filed in Color)

(56) References Cited

U.S. PATENT DOCUMENTS

| | | | | |
|---|---|---|---|---|
| 11,927,965 | B2 * | 3/2024 | Ebrahimi Afrouzi | |
| | | | | G06F 3/04845 |
| 12,025,985 | B2 * | 7/2024 | Van De Velde | G05D 1/0044 |
| 12,333,512 | B2 * | 6/2025 | Cella | B25J 9/1653 |
| 12,367,438 | B2 * | 7/2025 | Grant | G06F 9/4881 |
| 12,420,844 | B2 * | 9/2025 | Chen | G06N 3/047 |
| 2018/0281191 | A1 * | 10/2018 | Sinyavskiy | A47L 11/4061 |
| 2019/0086934 | A1 * | 3/2019 | Canoso | G05D 1/0231 |
| 2019/0187703 | A1 * | 6/2019 | Millard | G05D 1/249 |
| 2020/0042018 | A1 * | 2/2020 | Chiba | G06Q 10/06312 |
| 2020/0293044 | A1 * | 9/2020 | Millard | G01C 21/20 |
| 2020/0293049 | A1 * | 9/2020 | De Castro | G05D 1/0248 |
| 2020/0398428 | A1 * | 12/2020 | Murray | B25J 9/1605 |
| 2021/0046655 | A1 * | 2/2021 | Deyle | B25J 9/1664 |
| 2022/0066456 | A1 * | 3/2022 | Ebrahimi Afrouzi | |
| | | | | G06F 3/04883 |
| 2022/0105629 | A1 * | 4/2022 | Natarajan | G05B 19/4189 |
| 2022/0163969 | A1 * | 5/2022 | Li | G08G 1/096811 |
| 2022/0236736 | A1 * | 7/2022 | de la Guardia Gonzalez | |
| | | | | G06V 20/58 |
| 2022/0288781 | A1 * | 9/2022 | Schoessler | B25J 9/1651 |
| 2022/0306152 | A1 * | 9/2022 | Zhang | B60W 60/0017 |
| 2022/0307849 | A1 * | 9/2022 | Chattopadhyay | G01C 21/3453 |
| 2022/0382287 | A1 * | 12/2022 | Van De Velde | G05D 1/226 |
| 2023/0202042 | A1 * | 6/2023 | Johnson | B25J 9/1666 |
| | | | | 700/248 |
| 2023/0386335 | A1 * | 11/2023 | Beaurepaire | G01S 7/4802 |

OTHER PUBLICATIONS

Kuffner et al., "RRT-connect: An efficient approach to single-query path planning", https://ieeexplore.ieee.org/abstract/document/844730, Proceedings 2000 ICRA, Millennium Conference, IEEE International Conference on Robotics and Automation, Symposia Proceedings (Cat No. 00CH37065), vol. 2 IEEE, 2000, 7 pages.

Kavraki et al., "Probabilistic roadmaps for path planning in high-dimensional configuration spaces", https://ieeexplore.ieee.org/abstract/document/508439, IEEE transactions on Robotics and Automation 12.4 (1996): 566-580, 37 pages.

Brock et al., "Decomposition-based Motion Planning: A Framework for Real-Time Motion Planning in High-Dimensional Configuration Spaces", In Proc. ICRA, 2001, 6 pages.

Uwacu et al., "Hierarchical Planning With Annotated Skeleton Guidance", https://ieeexplore.ieee.org/abstract/document/9851528, IEEE Robotics and Automation Letters 7.4 (2022) : 11055-11061, 7 pages.

Shah et al., "Using Deep Learning to Bootstrap Abstractions for Hierarchical Robot Planning", https://arxiv.org/abs/2202.00907, 21st International Conference on Autonomous Agents and Multiagent Systems, AAMAS 2022, International Foundation for Autonomous Agents and Multiagent Systems (IFAAMAS), 2022, 14 pages.

Kottinger et al., "Conflict-based search for multi-robot motion planning with kinodynamic constraints", https://ieeexplore.ieee.org/abstract/document/9982018, 2022 IEEE/RSJ International Conference on Intelligent Robots and Systems (IROS). IEEE 2022, 7 pages.

Phillips et al., "Sipp: Safe interval path planning for dynamic environments", https://ieeexplore.ieee.org/abstract/document/5980306, 2011 IEEE international conference on robotics and automation. IEEE, 2011, 8 pages.

Street et al., "Multi-robot planning under uncertainty with congestion-aware models", https://www.ifaamas.org/Proceedings/aamas2020/pdfs/p1314.pdf, (2020), 9 pages.

Cecchi et al. "Priority-based distributed coordination for heterogeneous multi-robot systems with realistic assumptions", https://ieeexplore.ieee.org/stamp/stamp.jsp?arnumber=9461616, IEEE Robotics and Automation Letters 6.3 (2021): 6131-6138, 8 pages.

Mannucci et al., "On provably safe and live multirobot coordination with online goal posting", https://ieeexplore.ieee.org/stamp/stamp.jsp?arnumber=9448306, IEEE Transactions on Robotics 37.6 (2021): 1973-1991, 19 pages.

Molina et al., "Identifying Critical Regions for Motion Planning using Auto-Generated Saliency Labels with Convolutional Neural Networks", Proc. ICRA, 2019, 6 pages.

Varambally, et al., "Which MAPF Model Works Best for Automated Warehousing?", In Proceedings of the International Symposium on Combinatorial Search, vol. 15, No. 1, 2022, pp. 190-198.

Shah et al., "Multi-Task Option Learning and Discovery for Stochastic Path Planning", arXiv preprint arXiv, 2210.00068, (2022).

Street et al., "Congestion-aware policy synthesis for multirobot systems", IEEE Transactions on Robotics 38, No. 1 (2021) : pp. 262-280.

Shah et al., "Learning to Create Abstraction Hierarchies for Motion Planning under Uncertainty", presented work supported by NSF under grant IIS 1942856, Arizona State University, Tempe, AZ, USA, (Jun. 2023) 14 pages.

Arul et al., "Dense Multi-Agent Navigation Using Voronoi Cells and Congestion Metric-based Replanning", arXiv:2202.11334V1 [cs.RO], Feb. 23, 2022, 7 pages.

* cited by examiner

200

202

210

212

240

224

260

First Robot
1302

Processor
1302a

Memory
1302b

Second Robots
1304

Processors
1304a

Memories
1304b

1300

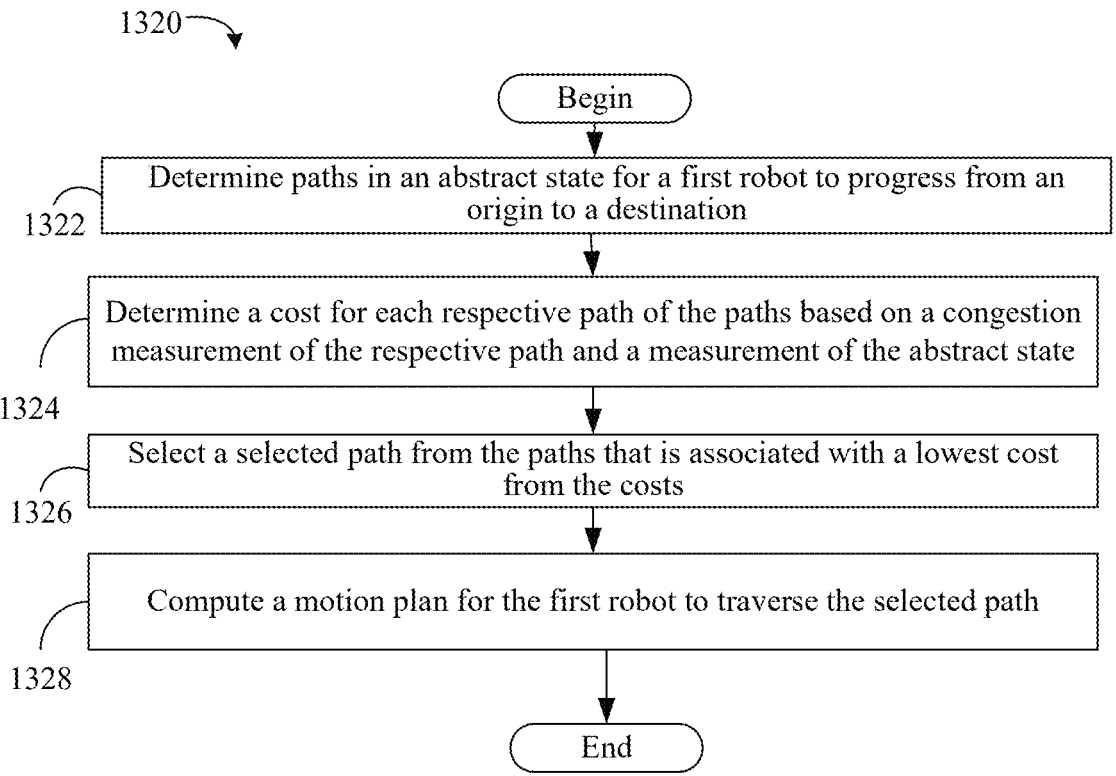

1320

Begin

Determine paths in an abstract state for a first robot to progress from an origin to a destination

1322

Determine a cost for each respective path of the paths based on a congestion measurement of the respective path and a measurement of the abstract state

1324

Select a selected path from the paths that is associated with a lowest cost from the costs

1326

Compute a motion plan for the first robot to traverse the selected path

1328

End

FIG. 13

LEARNING ABSTRACTIONS FOR MULTI-ROBOT PATH PLANNING IN UNSTRUCTURED ENVIRONMENTS

CROSS-REFERENCE TO RELATED APPLICATION

The present application claims the benefit of priority to U.S. Provisional Patent Application No. 63/590,252, filed on Oct. 13, 2023, which is incorporated by reference herein in its entirety.

TECHNICAL FIELD

Embodiments generally relate to robot path planning. In detail, examples relate to planning a robot path based on based on human congestion and robot congestion in an abstract state and in a decentralized fashion.

BACKGROUND

Recently, there has been a significant increase in the use of robots to carry out different tasks in various settings such as manufacturing centers, warehouses, restaurants, delivery robots, etc. In such scenarios, robots may seek to safely navigate in a dynamic environment that includes actively working robots and humans to accomplish tasks. Such environments may change quickly and frequently.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In some aspects, the techniques described herein relate to a computing system including a processor, and a memory having a set of instructions, which when executed by the processor, cause the computing system to determine paths in an abstract state for a first robot to progress from an origin to a destination, determine a cost for each respective path of the paths based on a congestion measurement of the respective path and a measurement of the abstract state, select a selected path from the paths that is associated with a lowest cost from the costs, and compute a motion plan for the first robot to traverse the selected path.

In some aspects, the techniques described herein relate to at least one computer readable storage medium including a set of instructions, which when executed by a computing device, cause the computing device to determine paths in an abstract state for a first robot to traverse between an origin and a destination, determine a cost for each respective path of the paths based on a congestion measurement of the respective path and a measurement of the abstract state, select a selected path from the paths that is associated with a lowest cost from the costs, and compute a motion plan for the first robot to traverse the selected path.

In some aspects, the techniques described herein relate to a method including determining paths in an abstract state for a first robot to traverse between an origin and a destination, determining a cost for each respective path of the paths based on a congestion measurement of the respective path and a measurement of the abstract state, selecting a selected path from the paths that is associated with a lowest cost from the costs, and computing a motion plan for the first robot to traverse the selected path.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee. The various advantages of the embodiments of the present disclosure will become apparent to one skilled in the art by reading the following specification and appended claims, and by referencing the following drawings, in which:

FIG. 13 illustrates a method of path planning.

DETAILED DESCRIPTION

Figure 1:
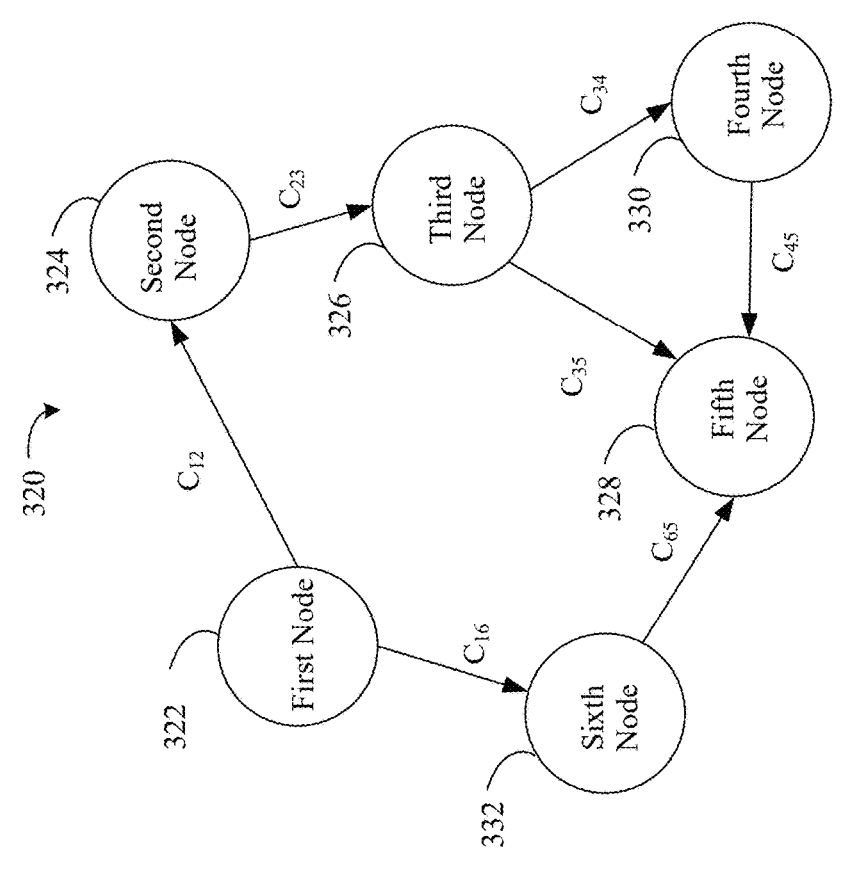
FIG. 1 is a hybrid robot path planning approach.

A motion planning for robots has generated significant interest as robots become more sophisticated in purpose and function. Several existing, non-hierarchical single-agent sampling-based motion planning methods have been developed. These approaches solely focus on solving the motion planning problem for a single robot and do not consider other robot or human movements in the environment (e.g., fail to consider congestion along a path), and therefore provide sub-optimal plans. Further existing motion planning on robot movement is computationally expensive.

Existing control approaches have been developed for allowing robots to navigate between dynamic obstacles (e.g., other robots, objects, and/or humans, etc.) without colliding with such dynamic obstacles. Such approaches rely on optimal, centralized control and as a consequence, only effectively work for short-horizon planning (e.g., short distance routes, not long-horizon planning or long-distance routes) given that the approaches include non-linear optimization. For example, in such existing control approaches, a central server may plan the paths for multiple robots by coordinating multiple and distinct factors to generate the paths. Such control approaches are computationally intensive and thus limit scalability. Further, such approaches may fail to operate in real time if the server is overloaded and is unable to process the distinct factors in a timely manner.

Furthermore, such processes may operate over the internet or another medium, increasing bandwidth and communication latency. Moreover, if the internet should fail, then the robots would be unable to receive instructions and may cease operation until the internet is re-established. Thus, such existing control approaches may not scale to larger designs (e.g., larger amounts of robots).

Some existing approaches develop a hierarchical motion planning framework. Such approaches construct a hierarchical model of the environment and use the hierarchical model to facilitate efficient motion planning. Such approaches also do not consider locations and movements of different robots and humans in the environment, and therefore provide sub-optimal plans.

Some other existing approaches have been developed for multi-robot motion planning. For example, a first approach develops an approach for jointly computing path plans for each robot in the environment in a discrete grid-like fashion. The first approach considers a joint state space of all the robots in the environment. Doing so may provide collision-free path plans in some cases. However, the first approach is computationally expensive and may fail to be executed in real time. Empirical evaluations show that the first approach does not scale to systems with more than three robots, resulting in narrow use cases.

A second approach develops a priority-based approach for multi-robot path finding in similar discrete environments. Instead of computing path plans in a joint state space as in the first approach, the second approach computes motion plans individually for each robot without considering locations and movements of the other robots in the environment. Doing so results in faster planning. However, empirical evaluation suggests that the second approach often encounters deadlocks and fails to plan valid collision-free path plans.

A third approach develops a multi-robot motion planning under uncertainty for grid-like indoor warehouse environments and models the problem as a Markov Decision Process (MDP). The third approach models the congestion in the environment as action stochasticity of the MDP. The third approach uses communication based prioritization with a decentralized multi-robot planning approach that uses a semaphore-like mechanism to acquire locks over regions in configuration-spaces for computing collision-free motion plans. The third approach may not account for human collisions.

Examples herein provide an enhanced approach that integrates hierarchical planning along with low-level motion planning and a controller for multi-agent motion planning in different settings. For example, the controller may provide a mathematical guarantee on safety. That is, examples have proven that under certain conditions/assumptions a robot (which may include a controller), method and apparatus as described herein will not be responsible and/or cause a collision. Examples generate a symbolic planning space that allows hierarchical planning and the use of powerful artificial intelligence (AI) methods to search high-level plans that facilitate refinement with a low-level motion planner. Examples consume less power relative to existing examples, reduce latency relative to existing examples, may operate with several different transmission mediums (e.g., internet, Bluetooth®, Near-field communication, etc.), and include a safe controller to execute in congested settings.

Examples further include a novel algorithm that tracks different robots that are conducting tasks in the given environment as well as human activity in various regions of the environment. In conventional examples, such information may not be efficiently utilized by a motion planning algorithms. Examples herein may generate a motion plan for a robot based on such information. That is, given that examples generate a discrete representation of the environment, examples may efficiently use human and robot information (e.g., motion) in real time to plan motion for new tasks by integrating the motion with the high-level search over abstract states. For example, the "a priori discretization" described herein refers to a representation of the map using an occupancy grid. An occupancy grid may be a representation of the world (space) using cells (e.g., squares or some other polygon). In some cases, it is unknown in advance what size to set the cells (e.g., boxes) to solve motion planning while keeping the memory resources manageable on an embedded computer. As discussed later, examples use occupancy grids, but store the occupancy grids locally and for the abstraction construction.

Examples herein include a hybrid and a hierarchical approach that works in the continuous environments (e.g., does not require a priori discretization of the environment) and combines the enhancements of centralized and de-centralized multi-robot motion planning approaches while providing significantly better empirical results. Additionally, approaches as discussed herein, unlike the other approaches, also consider human movements in the environment while motion planning for the robots.

Examples include a developed approach that is a hybrid multi-robot motion planner. The hybrid multi-robot motion planner is hybrid in that that the hybrid multi-robot motion planner possesses synergistic attributes of both centralized and de-centralized multi-robot motion planners to enhance efficiency, reduce processing power and reduced bandwidth.

For example, centralized motion planners (e.g., motion planners that plan in the joint configuration space of the robot) may provide the enhancement of full observability over the current locations of the robot. Such information facilitates planning of collision-reduced, if not collision-free, motion plans for robots. However, given that these planners plan in a join configuration space, such centralized planners often operate in discretized spaces and may not scale well to scenarios with a high number of robots (typically >5 robots).

On the other hand, de-centralized motion planners do not consider joint configuration space and plan for each robot individually. Therefore, de-centralized motion planners are computationally faster in computing first candidate motion plans, but at the same time de-centralized motion planners operate based on expensive operations for deadlock resolution. Such motion planners also often require priorities for deadlock resolution in advance. Analysis shows that state-of-the-art decentralized motion planners failed to produce conflict-free motion plans for when a significant amount of robots (e.g., more than ten robots) plan paths. As such, dec-centralized motion planners fail to scale to larger multi-robot scenarios.

Examples herein include a developed approach that is a hybrid approach that incorporates technical aspects to both the centralized and de-centralized approaches to generate a synergy that results in several technical enhancements. The hybrid approach builds on de-centralized approaches. Examples herein may bypass consideration of joint configuration spaces of each robot (e.g., may not consider joint configuration spaces) and compute motion plans individually for each robot. Examples herein further track a current location of each robot in an environment. In conventional examples, tracking the current location of robots in real time may not be feasible when motion planning. For example, motion planning in conventional examples may not be determined based on the current location of robots, rather motion planning may be executed based on prior obtained location information of a robot which may not be the current location of the robot. Enhanced examples herein operate in a hierarchical setting with both continuous and symbolic state spaces (e.g., abstract states) to enable the enhanced examples to monitor and generate plans based on robots and human congestion in the environment in real time.

Examples herein include an approach that uses the concepts of critical regions and region-based Voronoi diagrams (RBVDs) to construct a discrete abstract model of the world and robot's actions. The discrete abstract model (e.g., a state abstraction) is similar to a Voronoi diagram, and generates cells around each region of interest such that the distance from each point in a cell to the corresponding interest region of the point is less than that from every other interest region. Examples may refer to this structure as the RBVD. Each cell in this RBVD is considered an abstract state and transitions between these Voronoi cells (abstract states) define abstract actions.

Examples herein construct a cost function for planning actions of robots to achieve goals using the information regarding the goal of the robot and congestion in the environment caused by movements of robots and humans. Present examples outperform prior state of the art in terms of number of robots that may be controlled at the same time, reduced processing power and reduced bandwidth.

FIG. 1 illustrates a hybrid robot path planning approach 300. In this example, a physical space diagram 334 is provided. The physical space diagram 334 may be a representation of a physical space, such as a warehouse, office space, residence, etc. The physical space diagram 334 may be an electronic version of the physical space and closely resemble the layout of the physical space.

A neural network 336 is trained to identify relevant parts of the physical space diagram 334. The relevant parts may be referred to as abstract states. The abstract states are areas that are of interest to robot path planning and dynamic obstacle movement (e.g., pedestrians, other robots, etc.). Portions of the physical space diagram 334 that a robot may traverse (e.g., travel through) may be labelled as abstract states, while portions that the robot is unable to traverse are not labelled as abstract states. The neural network 336 may generate an abstract map 314 based on the physical space diagram 334. The abstract map 314 includes the abstract states. The abstract map 314 include the abstract states positioned on the physical space diagram 334. The abstract states include a first room 302, a second room 304, a third room 306, a fourth room 308, a fifth room 310 and a sixth room 316.

The abstract map 314 may thus represent traversable portions (e.g., abstract states) of the physical location. The physical location may contain rooms and obstacles within the rooms. For example, the rooms contain robots and humans. The robots and humans may be considered dynamic obstacles. That is the robot and humans may be in motion and have dynamically changing positions, and are thus dynamic obstacles.

The abstract map 314 represents the rooms as first room 302, second room 304, third room 306, fourth room 308, fifth room 310 and sixth room 316. The abstract map 314 also includes a first robot 312. The abstract map 314 also includes humans (represented as people) a first robot 312, and second-sixth robots $R_2$-$R_6$. The robots $R_2$-$R_6$ may be similarly configured to the first robot 312.

The first robot 312 and robots $R_2$-$R_6$ may be autonomous robots. That is, the first robot 312 and robots $R_2$-$R_6$ may operate without human intervention. As such the first robot 312 and robots $R_2$-$R_6$ may be responsible for path planning in order to accomplish tasks.

For example, in an industrial setting the first robot 312 may be tasked with moving items from first room 302 to fifth room 310. Multiple paths exist for doing so. For example, a first path $P_1$ originates in first room 302, extends through second room 304, third room 306 and fourth room 308, and terminates in fifth room 310. A second path $P_2$ originates in first room 302, extends through second room 304 and third room 306, and directly extends into the fifth room 310 from the third room 306. A third path $P_3$ extends through the sixth room 316 and then terminates in the fifth room 310.

The first robot 312 may identify a cost to traverse each of the different first-third paths $P_1$-$P_3$. For example, a first cost of the first path $P_1$ is $C(P_1)$, a second cost of the second path $P_2$ is $C(P_2)$, and a third cost of the third path $P_3$ is $C(P_3)$. The first robot 312 may determine the first-third costs based on a custom cost function. For example, the first robot 312 may execute a high-level search using the custom cost function. The custom cost function incorporates different measures that allow the first robot 312 to account for i) difficulty of traversing different first, second, third, fourth, fifth and sixth rooms 302, 304, 306, 308, 310, 312 along a respective path of the paths $P_1$-$P_3$, ii) congestion caused by second-fifth robots $R_2$-$R_5$ moving in the environment (e.g., robot congestion measurement), iii) difficulties of traversing areas with human movements (e.g., human congestion measurement). The custom cost function is defined as follows in Equation 1:

$$c(s) = \alpha c^d(s) + \frac{\beta c^h(s) + \gamma c^r(s)}{\sigma c^s(s)} \qquad \text{Equation 1}$$

In Equation 1, $s_g$ defines the abstract state that contains the goal configuration. Here, $c^d(s)$ defines an estimated distance between the current abstract state s and the goal abstract state $s_g$. $c^r(s)$ and $c^h(s)$ define robot and human congestion measurements respectively; $c^s(s)$ defines a measurement (e.g., the size) of the entire abstract state. $\alpha$, $\beta$, $\gamma$ and $\sigma$ are tunable hyper parameters that alter the behavior of Equation 1 to encode preferences. These preferences allow the robots to prioritize different situations (e.g., human occupied areas and robot occupied areas, longer plans or congested areas, etc.).

Notably $c^r(s)$ and $c^h(s)$ define robot and human congestion measurements. Notably, examples may seek to minimize the amount of robots that are on a same path, and/or position, at a same time. Doing so may reduce collisions and increase the speed that robots may travel since the robots may not encounter as many dynamic obstacles. Thus, Equation 1 penalizes paths that include robots and humans, and increases the penalties as the number of robots and humans increases. The hyperparameter $\beta$ controls an influence of the human congestion measurement on the overall cost, and the hyperparameter $\gamma$ controls an influence of the robot congestion measurement on the overall cost. Thus, depending on the situation, the hyperparameter $\beta$ may be increased to increase the influence of the human congestion measurement on the overall cost. Similarly, the hyperparameter $\gamma$ may be increased to increase an influence of the robot congestion measurement on the overall cost. In some examples, the robots may adjust to avoid regions even if the robots have just a few people and prefer regions with robots even if there are many robots there. That is, some examples may provide more weight to regions that have just a few people in and have less weight to regions with many robots. For example, robots may be able to more easily predict the path and motion of other robots, and therefore selectively avoid areas with people and enter areas with robots.

Furthermore, in this example, the robot and human congestion measurements $c^r(s)$ and $c^h(s)$ are normalized based on $c^s(s)$ which is the measurement (e.g., the size) of the entire abstract state. As such, if the size of the abstract state increases, an influence of the robot and human congestion measurements $c^r(s)$ and $c^h(s)$ on the total score correspondingly decreases. For example, a large abstract state may contain many robots and humans while still having significant unoccupied space for the first robot 312 to traverse, meaning that collisions are less likely. A small abstract state may contain less humans and robots but have limited unoccupied space for the first robot 312 to traverse, meaning that collisions are more likely. Therefore, the robot and human congestion measurements $c^r(s)$ and $c^h(s)$ are weighed against the size of the abstract state $c^s(s)$. Notably, $c^d(s)$ (i.e., the estimated distance between the current abstract state s and the goal abstract state $s_g$) is not normalized against the size of the abstract state. The hyperparameter $\sigma$ controls an influence of the size of the abstract state $c^s(s)$ while $\alpha$ controls an influence of $c^d(s)$. In some examples, Equation 1 may be adjusted to further consider other factors, including a priority of robots, and emergency situations of robots. The priority of robots, humans, etc. may be adjusted in Equation 1. Some other factors include room temperature or light conditions in case the robot is carrying temperature sensitive cargo, radiation exposure in case the robot is not radiation hardened and movable object cluttering etc.

As noted, the cost is proportional to the number of humans and robots. Thus, a path with a smaller cost is more likely to be selected for the first robot 312 to traverse, while a path with a larger cost will likely be avoided for the first robot 312 to traverse. A path from the first-third paths $P_1$-$P_3$ with a lowest cost from the first-third costs $C(P_1)$, $C(P_2)$ and $C(P_3)$ is selected for the first robot 312 to traverse from the first room 302 to the fifth room 310.

The first robot 312 may therefore generate the first, second and third costs $C(P_1)$, $C(P_2)$ and $C(P_3)$ based on the custom cost function (Equation 1). As noted above, the custom cost function generates the cost based on congestion of humans and congestion of robots along a particular path of the paths $P_1$-$P_3$. The following table provides the number of humans and robots in different abstract states:

TABLE I

| Room | Humans | Robots |
|---|---|---|
| First Room 302 | 1 | 0 |
| Second Room 304 | 3 | 0 |
| Third Room 306 | 2 | 1 |
| Fourth Room 308 | 3 | 0 |
| Fifth Room 310 | 3 | 0 |
| Sixth Room 316 | 4 | 4 |

The first robot 312 may determine $C(P_1)$, $C(P_2)$ and $C(P_3)$ based on a graph 320 that maps the costs of each traversal. That is, a cost of each traversal of a respective path of the first, second and third paths $P_1$, $P_2$ and $P_3$ is identified, and then summed together to determine a final value for the respective path.

In detail, the first node 322 represents first room 302, second node 324 represents the second room 304, third node 326 represents the third room 306, fourth node 330 represents the fourth room 308, fifth node 328 represents the fifth room 310 and the sixth node 332 represents the sixth room 316.

The first robot 312 may calculate the cost of travel based on equation 1 and between the first node 322, second node 324, third node 326, fifth node 328, fourth node 330 and sixth node 332. For example, cost $C_{12}$ is the cost to travel between first node 322 and second node 324, cost $C_{23}$ is the cost to travel between second node 324 and third node 326, cost $C_{34}$ is the cost to travel between third node 326 and fourth node 330, cost $C_{35}$ is the cost to travel between third node 326 and fifth node 328, cost $C_{16}$ is the cost to travel between first node 322 and sixth node 332, $C_{65}$ is the cost of travel between sixth node 332 and fifth node 328, and $C_{45}$ is the cost of travel between fourth node 330 and fifth node 328. Different ones of the costs $C_{12}$, $C_{23}$, $C_{34}$, $C_{35}$, $C_{16}$, $C_{65}$ and $C_{45}$ may be summed together to generate the costs $C(P_1)$, $C(P_2)$ and $C(P_3)$. For example, $C(P_1)$ would be the sum of costs $C_{12}$, $C_{23}$, $C_{34}$, and $C_{45}$. The costs $C_{12}$, $C_{23}$, $C_{34}$, $C_{35}$, $C_{16}$, $C_{65}$ and $C_{45}$ may be generated once and then referenced to generate the costs $C(P_1)$, $C(P_2)$ and $C(P_3)$. For example, the costs $C_{12}$, $C_{23}$, $C_{34}$, $C_{35}$, $C_{16}$, $C_{65}$ and $C_{45}$ may be stored in a data structure, such as a lookup table and/or database, and referenced accordingly.

In this example, the first path $P_1$ includes the first room 302, second room 304, third room 306, fourth room 308 and fifth room 310. The costs of movement across each portion of the first path $P_1$ may be calculated. For example, the first path $P_1$ extends across first room 302, to second room 304, third room 306, fourth room 308 and fifth room 310. Therefore, the cost of moving from the first room 302 to second room 304 may be $C_{12}$, the cost of moving from the second room 304 to the third room 306 may be $C_{23}$, the cost of moving from the third room 306 to the fourth room 308 may be $C_{34}$ and the cost of moving from the fourth room 308 to the fifth room 310 may be $C_{45}$. The total cost of first path $P_1$ may be the summation of $C_{12}$, $C_{23}$, $C_{34}$ and $C_{45}$.

Notably, the costs $C_{12}$, $C_{23}$, $C_{34}$ and $C_{45}$ may be individually calculated to avoid skewing the results. For example, if the first cost $C(P_1)$ was calculated once based on a summation of the number of people, a summation of the robots in the abstract states of path $P_1$, overall distance in the abstract states of path $P_1$, and a summation of the sizes of the abstract states of path $P_1$, the results may be inaccurate. For example, in such a scenario if a small room of the first room 302, second room 304, third room 306, fourth room 308 and fifth room 310 has a large amount robots and/or humans in a small space, the overall cost function may still nonetheless be low if one of the first room 302, second room 304, third room 306, fourth room 308 and fifth room 310 has a large space that offsets the small space. Thus, despite a collision being probable in the small room, the first cost $C(P_1)$ may be low due to the large space.

In this example, the total number of humans in first room 302 and second room 304 is 4, and the number of robots is zero since the first robot 312 is excluded. A distance of a portion of the first path $P_1$ through the first room 302 and the second room 304 may be 10 meters, and a size of the abstract states of the first room 302 and second room 304 may be 250 $m^2$. As such, the cost $C_{12}$ is indicated as below:

$$C_{12} = \propto c^d(10) + \frac{\beta c^h(4) + \gamma c^r(0)}{\sigma c^s(250)} \qquad \text{Equation 2}$$

The final value of $C_{12}$ will be dependent on the hyperparameters $\alpha$, $\beta$, $\gamma$ and $\sigma$, as well as the exact operations of the functions $c^d$, $c^r$, $c^h$ and $c^s$. Equation 2 is based on Equation 1 with relevant values.

Further, the total number of humans in second room 304 and third room 306 is 5, and the number of robots is one (robot $R_6$) since the first robot 312 is excluded. A distance of a portion of the first path $P_1$ through the second room 304 and third room 306 may be 15 meters, and a size of the abstract states of the second room 304 may be 300 $m^2$. As such, the cost $C_{23}$ is indicated as below:

$$C_{23} = \propto c^d(15) + \frac{\beta c^h(5) + \gamma c^r}{\sigma c^s(300)} \qquad \text{Equation 3}$$

The final value of $C_{23}$ will be dependent on the hyperparameters $\alpha$, $\beta$, $\gamma$ and $\sigma$, as well as the exact operations of functions $c^d$, $c^r$, $c^h$ and $c^s$. Equation 2 is based on Equation 1 with relevant values. $C_{34}$ and $C_{45}$ may be similarly calculated.

Further, the $C(P_2)$ of second path $P_2$ may the summation of $C_{12}$, $C_{23}$, $C_{35}$. The $C(P_3)$ of third path $P_3$ may the summation of $C_{16}$, $C_{65}$.

In this example, the first robot 312 determines that $C(P_2)$ is the lowest cost from the costs $C(P_1)$, $C(P_2)$ and $C(P_3)$. For example, path $P_1$ has a greater number of humans and greater distance relative to path $P_2$, and a same number of robots (i.e., one) of the robots $R_2$-$R_6$ as path $P_2$. Thus, logically based on Equation 1, $C(P_3)$ is greater than $C(P_2)$.

Furthermore, the third path $P_3$ has smaller costs for distance and humans (e.g., 8 humans) than the second path $P_2$ (e.g., 9 humans). The cost of the robots $R_2$-$R_5$ along the third path $P_3$ significantly increases the cost of the third path $P_3$ to an extent that $C(P_3)$ is greater than $C(P_2)$ despite the smaller distance and humans.

For example, initially the robots $R_2$-$R_5$ may have workflows that include travelling between the first room 302 and the fifth room 310. Thus, the robots $R_2$-$R_5$ may select the shortest distance paths with the least humans, which is through sixth room 316. As the sixth room 316 becomes more congested, movement through the sixth room 316 becomes more difficult, prone to collision, more prone deadlock situations (e.g., two robots have overlapping paths and have difficulty maneuvering around each other) and slower. Therefore, examples consider not only the humans, but also the robots. As such, the first robot 312 determines that the second path $P_2$ should be selected and traverses the second path $P_2$ based in part on the robots $R_2$-$R_5$ being positioned in the sixth room 316.

In some examples, once the second path $P_2$, is selected, the first robot 312 may execute sampling-based motion planning to compute a low-level motion plan for the first robot 312 to follow the second path $P_2$. The first robot 312 may be dynamically controlled based on the motion plan and in particular on changes in the environment. For example, dynamic obstacles may not be stationary, and instead move between abstract states. The abstract states include the first room 302, second room 304, third room 306, fourth room 308, fifth room 310 and sixth room 316 as noted above. As the dynamic obstacles (e.g., humans and robots $R_2$-$R_6$) move through the abstract states, the first robot 312 may identify other paths to travel from a current position of the first robot 312 to the destination of the first robot 312, or the fifth room 310. Thus, while the second path $P_2$ is initially selected, the first robot 312 may receive updated information (e.g., positions of dynamic obstacles) and adjust accordingly by identifying new paths, generating new costs for the new paths based on Equation 1, selecting one of the new paths with a lowest cost to follow and then following the selected one path.

In some examples, the first robot 312 and the robots $R_2$-$R_6$ may communicate with each other to exchange information about the surrounding environment. For example, the first robot 312 may generate the first-third costs $C(P_1)$, $C(P_2)$ and $C(P_3)$ based on the human congestion measurements and the robot congestion measurements. The first robot 312 may receive information from the robots $R_2$-$R_6$ to determine the number of people and the number of robots $R_2$-$R_6$ that are within each of the first room 302, second room 304, third room 306, fourth room 308, fifth room 310 and sixth room 316 (abstract states). For example, the robots $R_2$-$R_6$ may include sensors that sense the humans, and each other, and provide information indicating the number of people and robots $R_2$-$R_6$ within the abstract states.

As a more detailed example, the robot $R_6$ may have a sensor that images the two humans in third room 306. The robot $R_6$ may then provide data (e.g., the images and/or an explicit statement that there are two people in the room) to the other robots $R_2$-$R_5$ as well as the first robot 312. Thus, the robots $R_2$-$R_6$ and the first robot 312 may update each other in real time (e.g., operate as internet-of-things devices). In some examples, other internet-of-things devices (e.g., imagers, audio recorders, etc.) may provide sensory data and/or an indication of the number of humans and the number of robots of the robots $R_2$-$R_6$ and first robot 312 in a particular area. Notably, communication may occur in different transmission mediums (e.g., internet, Bluetooth®, Near-field communication, etc.).

Local navigation of the first robot 312 may be controlled with a custom controller of the first robot 312 designed for navigating among the humans and dynamic obstacles (e.g., robots $R_2$-$R_6$). The custom controller executes the computed motion plan to follow the second path $P_2$. A plan executor of the first robot 312 may report a current location and characteristics of the current location (e.g., number of people and robots proximate to the robot) to an occupancy monitor of the first robot 312 and the robots $R_2$-$R_5$. Each respective robot of the robots $R_2$-$R_5$ may provide a number of humans and other robots of the first robot 312 and $R_2$-$R_5$ that are proximate to the respective robot to occupancy monitors of the first robot 312 and the robots $R_2$-$R_5$.

In some examples, the abstract map 314 is an abstraction constructed using a RBVD to produce a motion plan for the first robot 312 and based on initial and goal configurations. Furthermore, while the abstraction includes a different abstraction state for each room of a physical area, some examples may generate several abstraction states for each of the rooms. For example, rather than having a first room 302 represent one room of the physical space, some examples may represent the one room with multiple abstraction states.

Figure 2:
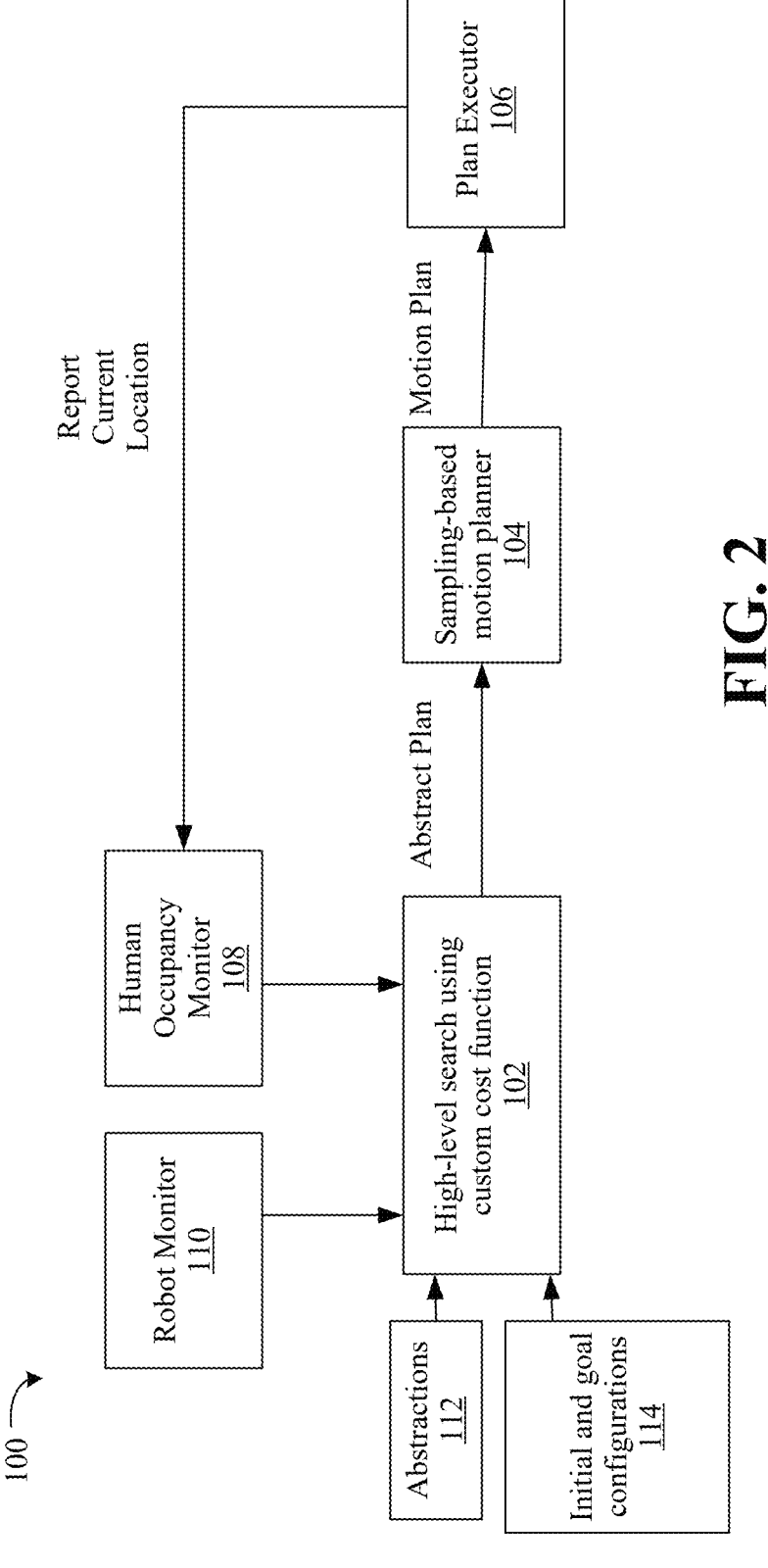
FIG. 2 is a diagram of an example of a robot planning approach.

FIG. 2 illustrates an autonomous control approach 100. The first robot 312 and/or robots $R_2$-$R_6$ (FIG. 1) may implement the autonomous control approach 100. The autonomous control approach 100 starts by first using a trained deep neural network to identify regions-of-interest in an environment. Once these regions-of-interest are identified, examples construct an RBVD. The RBVD includes a set of abstract states S represented as abstractions 112, and a set of abstract actions that takes robots from one abstract state to the next neighboring abstract state.

Examples include two monitoring modules: i) a robot monitor 110 that monitors robots (e.g., positions of the robots) and ii) a human occupancy monitor 108 that monitors human occupancy of the different regions (e.g., positions of the humans). Various systems may provide human occupancy scores for a region for some time t+N in the future given the current time t and current locations of the humans in the environment can be used as this module.

Given the initial and goal configuration 114 of a robot, examples first compute a high-level, abstract plan over the symbolic states using the abstract actions. For computing this abstract plan, examples employ a high-level search using a custom cost function 102 that incorporates different measures that allows examples to account for i) difficulty of going through an abstract state, ii) congestion caused by different robots moving in the environment (e.g., robot congestion measurement), iii) difficulties of traversing areas with human movements (e.g., human congestion measurement). The custom cost function is defined in Equation 1 noted above.

Once, a high-level, abstract plan is computed and output by the high-level search using the custom cost function 102, examples use sampling-based motion planner 104 planner to compute a low-level motion plan for the robot. Examples may delegate the responsibility of local navigation to a custom controller designed for navigating amongst humans and dynamic obstacles that may be used with executing the computed motion plan. The custom controller may be part of the robot. The plan executor 106 may report a current location and characteristics of the current location (e.g., number of people and robots proximate to the robot) to the human occupancy monitor 108. Second robots (not illustrated) may provide a number of humans and other robots proximate to the second robots to the human occupancy monitor 108 and the robot monitor 110. A robot (e.g., first robot 312) may be controlled based on the motion plan.

Thus, the autonomous control approach 100 shows the overall logical framework and the structure of robot. The autonomous control approach 100 takes as input an abstraction 112 constructed using RBVD and produces a motion plan for the provided robot and the initial and goal configuration 114.

Figure 3:
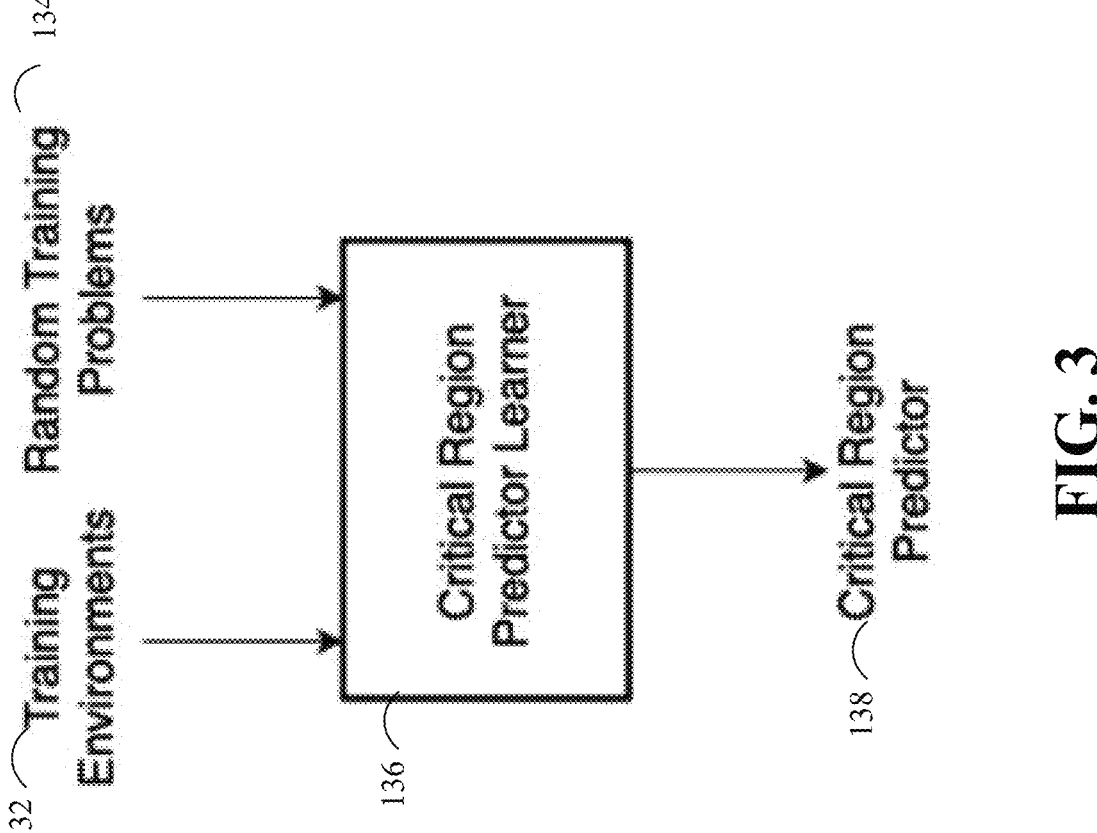
FIG. 3 is a diagram of an example of a data flow diagram.

FIG. 3 illustrates a data flow diagram 130 according to examples herein. The data flow diagram 130 may generally be implemented as part of the hybrid robot path planning approach 300 (FIG. 1) and/or autonomous control approach 100 (FIG. 2). For example, the first robot 312 and/or robots $R_2$-$R_6$ (FIG. 1) may implement the data flow diagram 130. Data flow diagram 130 includes training the critical region predictor learner 136 similar to autonomous control approach 100. The critical region predictor learner 136 may receive data from training environments 132 and random training problems 134. The critical region predictor learner 136 provides a critical region predictor 138 (e.g., which regions are the most critical (challenging) for the motion planning algorithm). The critical regions inform the construction of the abstract states in the RBVD construction 158. The critical regions may restrict the search space so that a sampling-based motion planner (e.g., sampling-based motion planner 104) may find a local motion plan faster.

Figure 4:
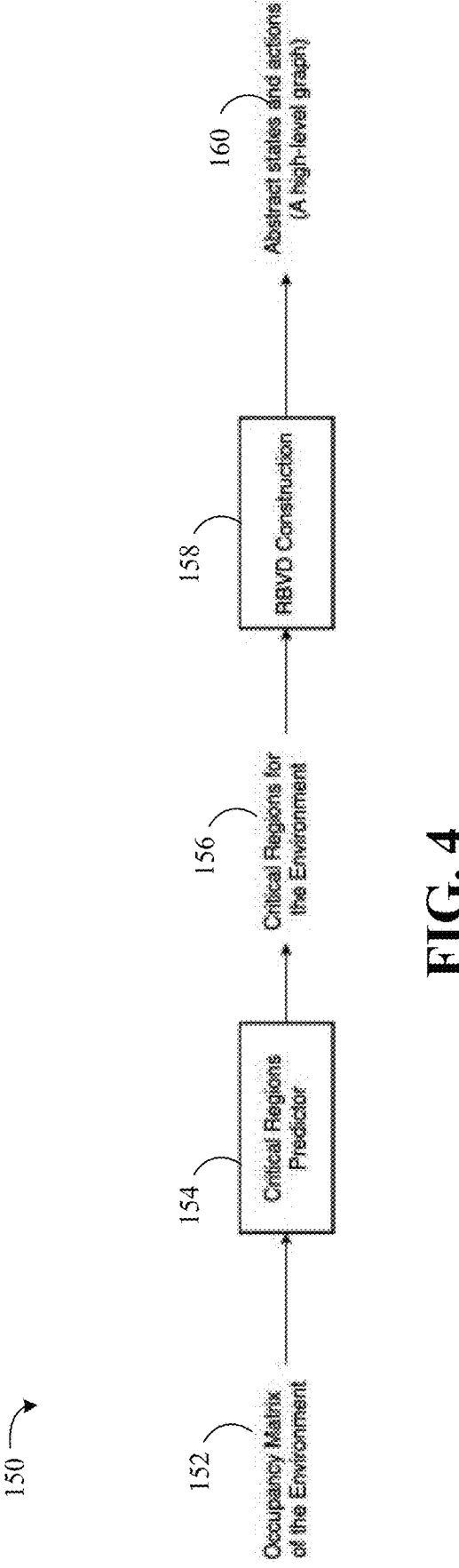
FIG. 4 is a diagram of an example of constructing a state abstraction.

FIG. 4 is an example of constructing a state abstraction 150. The state abstraction 150 may generally be implemented as part of the hybrid robot path planning approach 300 (FIG. 1), autonomous control approach 100 (FIG. 2) and/or data flow diagram 130 (FIG. 3). The first robot 312 and/or robots $R_2$-$R_6$ may implement the constructing of the state abstraction 150.

An occupancy matrix of the environment 152 is provided. An occupancy matrix is a grid world map of the environment where every grid point is either 0 (not occupied) or 1 occupied. The critical regions predictor 154 may receive the occupancy matrix of the environment 152 and generate critical regions for the environment 156. A RBVD construction 158 may receive the critical regions for the environment 156 and output abstract states and actions 160 (e.g., a high-level graph). In some examples, the abstract states and actions 160 may be an abstract map, such as abstract map 314 (FIG. 1).

Figure 5:
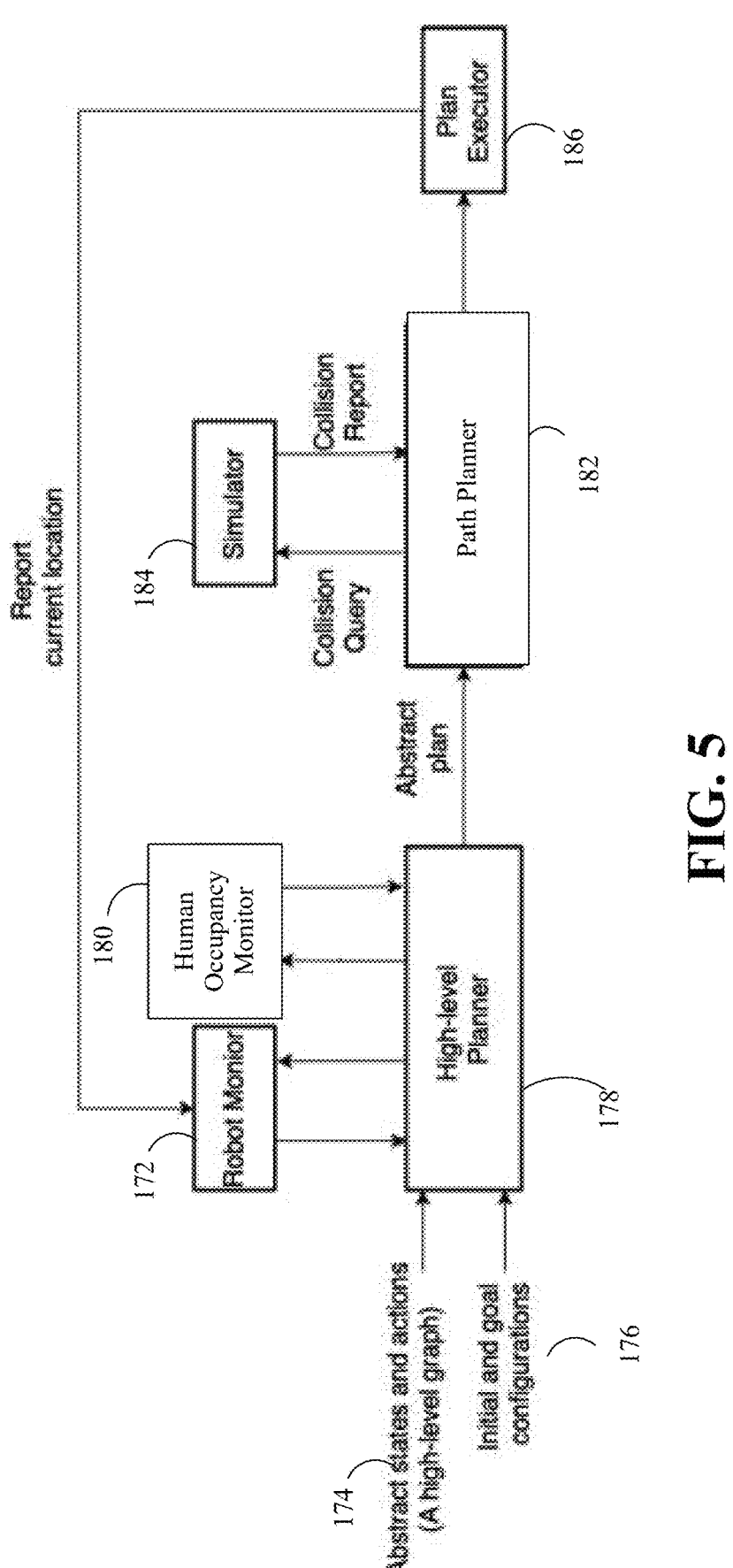
FIG. 5 is a diagram of an example of an architecture for computing the motion plan.

FIG. 5 illustrates an architecture 170 for computing a motion plan for a robot to implement. The architecture 170 may generally be implemented as part of the hybrid robot path planning approach 300 (FIG. 1), autonomous control approach 100 (FIG. 2), data flow diagram 130 (FIG. 3) and/or state abstraction 150 (FIG. 4). The first robot 312 and/or robots $R_2$-$R_6$ (FIG. 1) may include architecture 170. The architecture 170 receives abstract states and actions 174 (e.g., a high-level graph). The architecture 170 further receives initial and goal configurations 176 (e.g., in abstract state). A high-level planner 178 outputs an abstract plan based on the abstract states and actions 174, initial and goal configurations 176, robot monitor 172 (e.g., provides a measurement of a number of robots in an abstract state) and human occupancy monitor 180 (e.g., provides a measurement of the number of humans in an abstract state). The initial and goal configurations 176 may be provided by an operator or another robot.

The abstract plan is provided to a path planner 182. The path planner 182 may adjust the abstract plan based on a simulator 184, which provides collision reports in response to collision queries. The path planner 182 may generate an adjusted plan, that is based on the abstract plan from the high-level planner 178. A plan executor 186 may implement the adjusted plan (e.g., control a robot to traverse a selected path) and report a current location of the robot to robot monitor 172. The robot monitor 172 may provide the reported current location to other robots as well as high-level planner 178.

Figure 6:
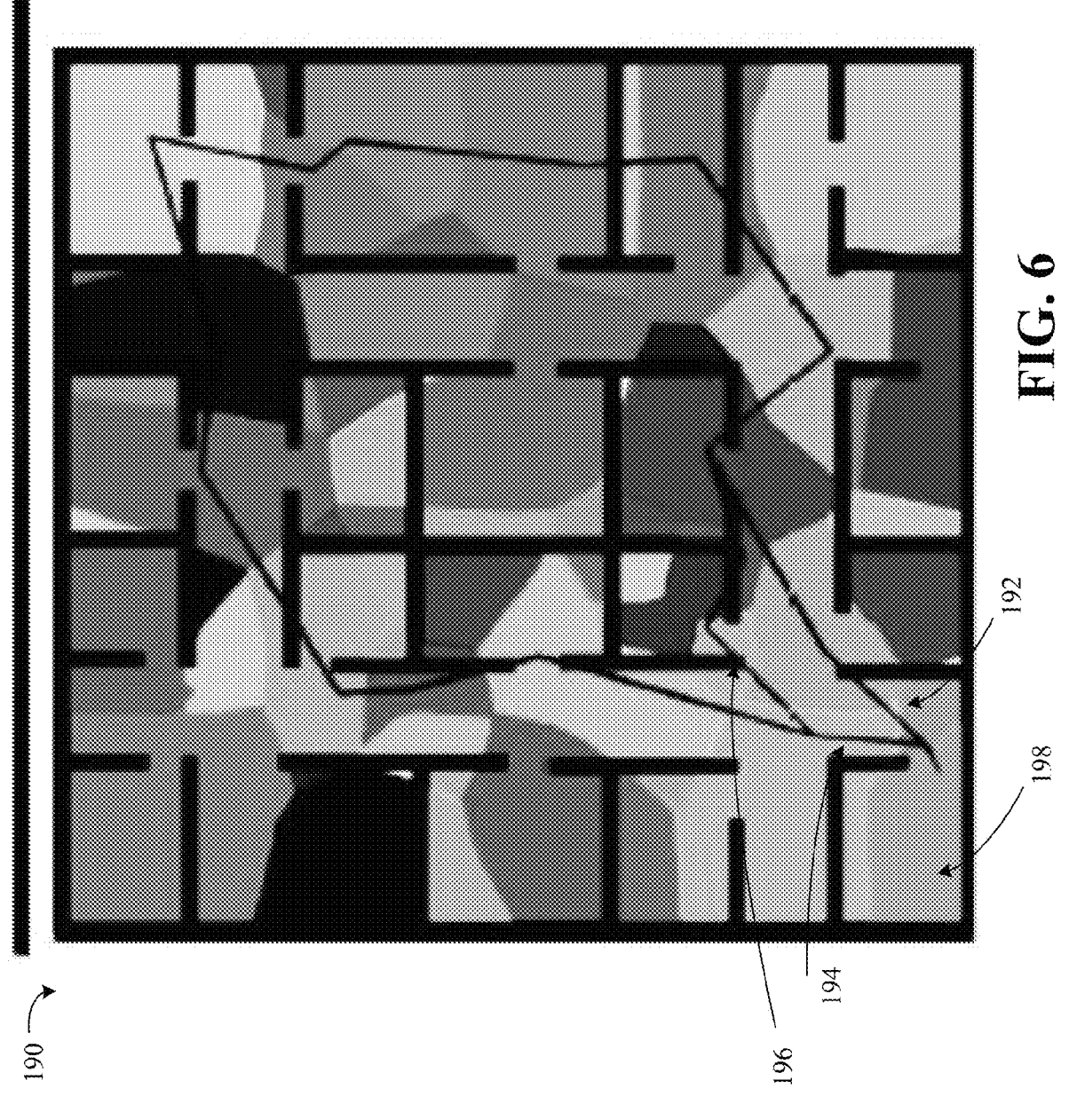
FIG. 6 is a diagram of an example of robots that plan from a same, initial location to the same location.

FIG. 6 shows a planning operation 190 for robots. The planning operation 190 may generally be implemented as part of the hybrid robot path planning approach 300 (FIG. 1), autonomous control approach 100 (FIG. 2), data flow diagram 130 (FIG. 3), state abstraction 150 (FIG. 4) and/or architecture 170 (FIG. 5). The robots plan paths from a same, initial location to the same destination location according to examples herein. It is observed that all three robots take tree different paths, 192, 194, 196. The abstract states are symbolized with different colors in the FIG. 6. In this example, different rooms, such as room 198, comprises several abstract states that robots may decide whether to move between.

Figure 7:
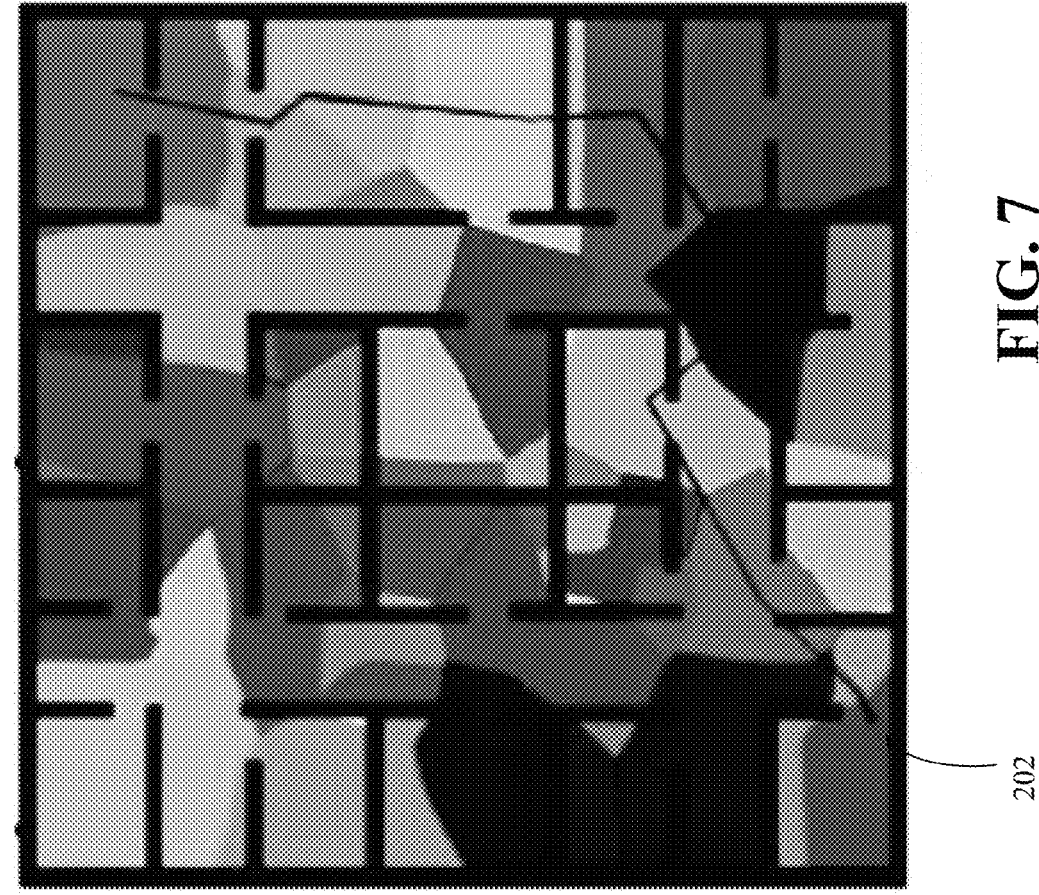
FIG. 7 is a diagram of an example of a planning operation where three robots plan from a same origin to the same destination.

FIG. 7 illustrates a planning operation 200. The planning operation 200 may generally be implemented as part of the hybrid robot path planning approach 300 (FIG. 1), autonomous control approach 100 (FIG. 2), data flow diagram 130 (FIG. 3), state abstraction 150 (FIG. 4) and/or architecture 170 (FIG. 5). In the planning operation 200, three robots plan from a same origin to the same destination, and sequentially in time (e.g., one after the other with time in between each traversal). As illustrated, all three robots follow the same path 202 due to the reduced robot congestion (e.g., all three robots are not traveling along the same portion of the path at the same time). The abstract states are symbolized with different colors in FIG. 7.

Figure 8:
FIG. 8 is a diagram of an example of a robot planning operation.

FIG. 8 illustrates a robot planning operation 210. The robot planning operation 210 may generally be implemented as part of the hybrid robot path planning approach 300 (FIG.

1), autonomous control approach 100 (FIG. 2), data flow diagram 130 (FIG. 3), state abstraction 150 (FIG. 4) and/or architecture 170 (FIG. 5). A robot plans an optimal (at high-level) plan including a path 212 from one location to another along path 212. The abstract states are symbolized with different colors in the FIG. 8.

Figure 9:
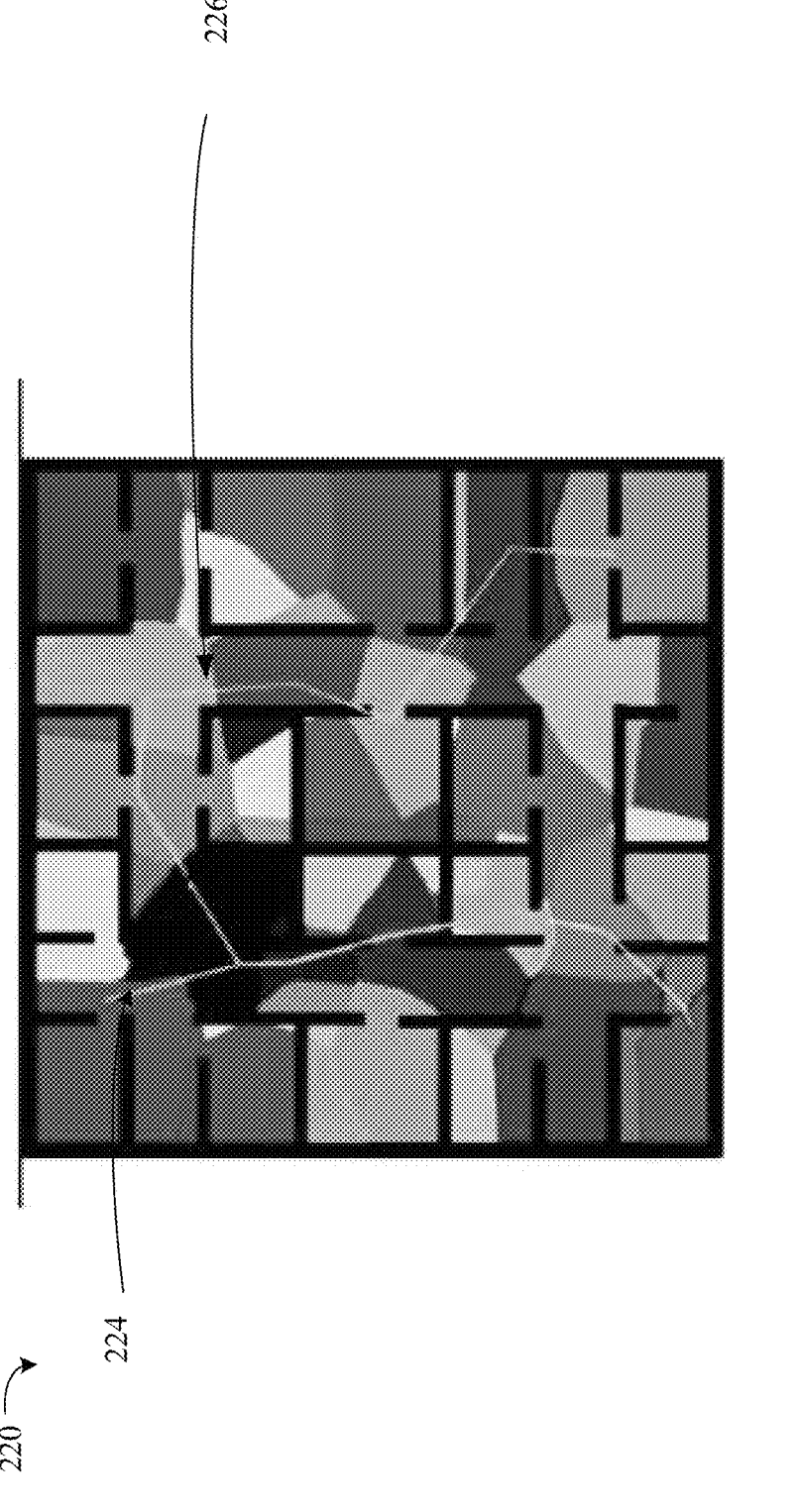
FIG. 9 is a diagram of an example of a schematic of robot planning.

FIG. 9 illustrates robot planning 220 for a similar situation as described above (e.g., origin and destination in abstract state) but now another robot is also planning at the same time. Thus, two different paths 224, 226 are determined for the robots to traverse. A first robot may traverse path 224, a second robot may traverse path 226. The robot planning 220 may generally be implemented as part of the hybrid robot path planning approach 300 (FIG. 1), autonomous control approach 100 (FIG. 2), data flow diagram 130 (FIG. 3), state abstraction 150 (FIG. 4) and/or architecture 170 (FIG. 5).

Figure 10:
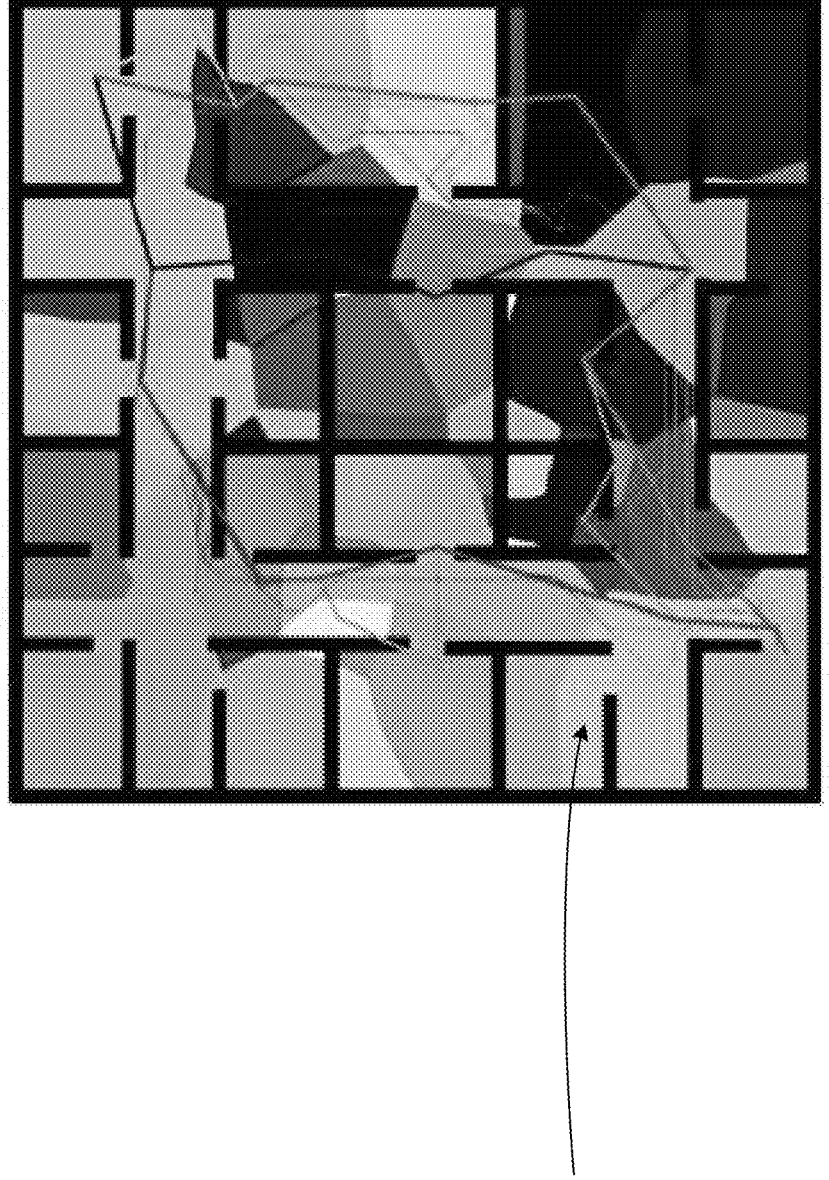
FIG. 10 is a diagram of an example of a multi-robot planning diagram.

FIG. 10 illustrates a multi-robot planning diagram 240. The planning operation 190 may generally be implemented as part of the hybrid robot path planning approach 300 (FIG. 1), autonomous control approach 100 (FIG. 2), data flow diagram 130 (FIG. 3), state abstraction 150 (FIG. 4) and/or architecture 170 (FIG. 5). The multi-robot planning diagram 240 plans for fifteen robots at the same time from the same initial location to the same goal location. Thus, multiple paths are illustrated. The darker lines show high-level plans, and the lighter lines show the motion plans. The high-level plans (e.g., abstract plans) may be a sequence of regions that the robot may visit. But the abstract plans may not provide information on how the robot should move from region to region. To move from region to region, the robot will create a motion plan (e.g., a precise path to follow). Path planner 182 may generate the motion plan. The high-level plans (e.g., abstract plans) are a sequence of regions that the robot intends on visiting. The abstract plan may not provide information on how the robot should move from region to region. To move from region to region, the robot may create a motion plan or a precise path to follow. The path planner 182 generates the motion plan.

As illustrated, the robots take different routes even though all robots are to travel from the same start location to end location.

Figure 11:
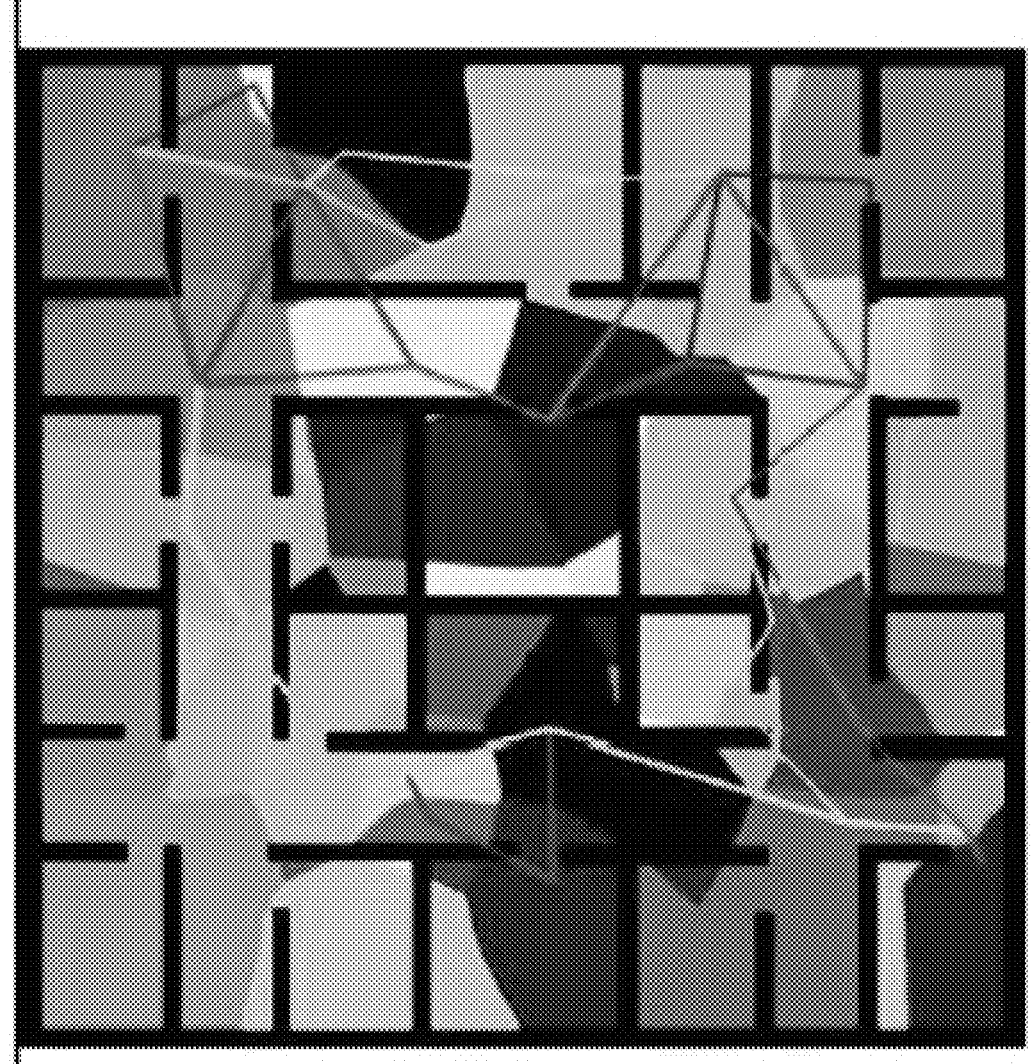
FIG. 11 is a diagram of an example of high-level plans.

FIG. 11 illustrates high-level plans 260 of multi-robot planning diagram 240 (FIG. 10) for further visualization. Multiple paths are illustrated. A path may be selected based on Equation 1.

Any of the aspects herein may generally be implemented in conjunction with any of the examples described herein. Examples may be implemented in logic instructions (e.g., software), configurable logic, fixed-functionality hardware logic, computer readable instructions stored on at least one non-transitory computer readable storage medium that are executable to implement aspects as described herein, circuitry, etc., or any combination thereof.

Figure 12:
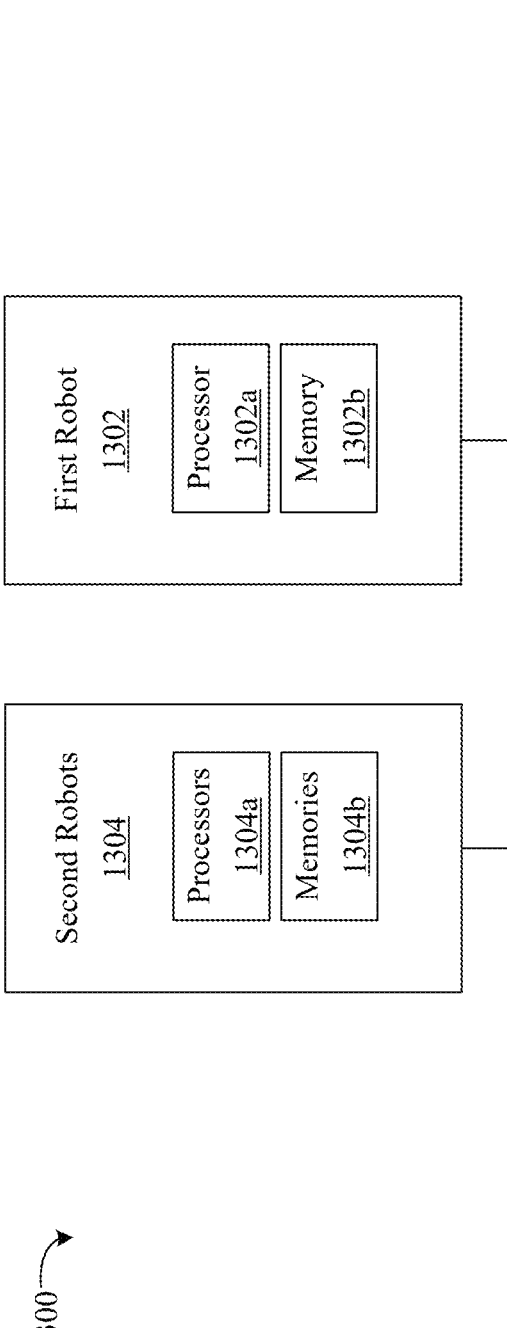
FIG. 12 is a diagram of an example of a computing system.

FIG. 12 shows a more detailed example of a computing system 1300 to implement aspects as described herein. The computing system 1300 may generally be implemented as part of the hybrid robot path planning approach 300 (FIG. 1), autonomous control approach 100 (FIG. 2), data flow diagram 130 (FIG. 3), state abstraction 150 (FIG. 4), architecture 170 (FIG. 5) planning operation 190 (FIG. 6), planning operation 200 (FIG. 7), robot planning operation 210 (FIG. 8), robot planning 220 (FIG. 9), multi-robot planning diagram 240 (FIG. 10), and high-level plans 260 (FIG. 11).

In the illustrated example, a first robot 1302 includes a processor 1302a (e.g., embedded controller, central processing unit/CPU) and a memory 1302b (e.g., non-volatile memory/NVM and/or volatile memory) containing a set of instructions, which when executed by the processor 1302a, cause the first robot 1302 to implement any of the aspects described herein. For example, the first robot 1302 may determine paths in an abstract state for a first robot to progress from an origin to a destination, determine a cost for each respective path of the paths based on a congestion measurement of the respective path and a measurement of the abstract state, select a selected path from the paths that is associated with a lowest cost from the costs, and compute a motion plan for the first robot to traverse the selected path. In some aspects, the congestion measurement includes a human congestion measurement of the respective path. In such aspects, the first robot 1302 receives a transmission from second robots 1304 that indicate positions of humans, and compute the human congestion measurement based on the positions of the humans. In some examples, the processor 1302a and the memory 1302b form a computing device.

In some aspects, the congestion measurement includes a robot congestion measurement of the respective path. In such aspects, the first robot 1302 receives a transmission from the second robots 1304 that indicate positions of the second robots 1304, and compute the robot congestion measurement based on the positions of the second robots.

In some aspects, the measurement of the abstract state is a size of the abstract state, and to determine the cost for each respective path of the paths, first robot 1302 determines the cost based on a length of the respective path in the abstract state. The first robot 1302 moves along the selected path based on the motion plan.

In the illustrated example, the second robots 1304 includes processors 1304a (e.g., embedded controller, central processing unit/CPU) and memories 1304b (e.g., non-volatile memory/NVM and/or volatile memory) containing a set of instructions, which when executed by the processor 1304a, cause the second robots 1304 to implement any of the aspects described herein. For example, the second robots 1304 may identify humans, other robots, generate and follow paths, etc. The second robots 1304 may communicate with the first robot 1302 over any suitable transmission medium. In some examples, each of the second robots 1304 includes one of the processors 1304a and one of the memories 1304b.

FIG. 13 shows a method 1320 of path planning. The method 1320 may generally be implemented as part of the hybrid robot path planning approach 300 (FIG. 1), autonomous control approach 100 (FIG. 2), data flow diagram 130 (FIG. 3), state abstraction 150 (FIG. 4), architecture 170 (FIG. 5) planning operation 190 (FIG. 6), planning operation 200 (FIG. 7), robot planning operation 210 (FIG. 8), robot planning 220 (FIG. 9), multi-robot planning diagram 240 (FIG. 10), high-level plans 260 (FIG. 11) and/or computing system 1300 (FIG. 12). In an embodiment, the method 1320 is implemented in logic instructions (e.g., software), a non-transitory computer readable storage medium, circuitry, configurable logic, fixed-functionality hardware logic, etc., or any combination thereof.

Illustrated processing block 1322 determines paths in an abstract state for a first robot to progress from an origin to a destination. Illustrated processing block 1324 determines a cost for each respective path of the paths based on a congestion measurement of the respective path and a measurement of the abstract state. Illustrated processing block 1326 selects a selected path from the paths that is associated with a lowest cost from the costs. Illustrated processing block 1328 computes a motion plan for the first robot to traverse the selected path.

The term "coupled" can be used herein to refer to any type of relationship, direct or indirect, between the components in question, and can apply to electrical, mechanical, fluid, optical, electromagnetic, electromechanical or other connections. In addition, the terms "first", "second", etc. can be used herein only to facilitate discussion, and carry no particular temporal or chronological significance unless otherwise indicated.

Those skilled in the art will appreciate from the foregoing description that the broad techniques of the embodiments of the present disclosure can be implemented in a variety of forms. Therefore, while the embodiments of this disclosure have been described in connection with particular examples thereof, the true scope of the embodiments of the disclosure should not be so limited since other modifications will become apparent to the skilled practitioner upon a study of the drawings, specification, and following claims.

We claim:

1. A computing system comprising:

a processor; and a memory having a set of instructions, which when executed by the processor, cause the computing system to:

determine paths in abstract states for a first robot to progress from an origin to a destination;

determine a cost for each respective path of the paths by normalizing a congestion measurement of a respective abstract state of the abstract states forming the respective path based on a size of the respective abstract state;

select a selected path from the paths that is associated with a lowest cost from the costs; and compute a motion plan for the first robot to traverse the selected path.

2. The computing system of claim 1, wherein each of the congestion measurements includes a human congestion measurement of the respective path.

3. The computing system of claim 2, wherein the instructions of the memory, when executed, cause the computing system to:

receive a transmission from a second robot that indicates positions of humans; and compute at least one of the human congestion measurements based on the positions of the humans.

4. The computing system of claim 1, wherein each of the congestion measurements includes a robot congestion measurement of the respective path.

5. The computing system of claim 4, wherein the instructions of the memory, when executed, cause the computing system to:

receive a transmission from a second robot that indicates positions of the second robot; and compute at least one of the robot congestion measurements based on the positions of the second robot.

6. The computing system of claim 1, wherein to determine the cost for each respective path of the paths, the instructions of the memory, when executed, cause the computing system to determine the cost based on a length of the respective path in the abstract state.

7. The computing system of claim 1, wherein the instructions of the memory, when executed, cause the computing system to:

move the first robot along the selected path based on the motion plan.

8. At least one non-transitory computer readable storage medium comprising a set of instructions, which when executed by a computing device, cause the computing device to:

determine paths in abstract states for a first robot to traverse between an origin and a destination;

determine a cost for each respective path of the paths by normalizing a congestion measurement of a respective abstract state of the abstract states forming the respective path based on a size of the respective abstract state;

select a selected path from the paths that is associated with a lowest cost from the costs; and compute a motion plan for the first robot to traverse the selected path.

9. The at least one non-transitory computer readable storage medium of claim 8, wherein each of the congestion measurements includes a human congestion measurement of the respective path.

10. The at least one non-transitory computer readable storage medium of claim 9, wherein the instructions, when executed, cause the computing device to:

receive a transmission from a second robot that indicate positions of humans; and compute at least one of the human congestion measurements based on the positions of the humans.

11. The at least one non-transitory computer readable storage medium of claim 8, wherein each of the congestion measurements includes a robot congestion measurement of the respective path.

12. The at least one non-transitory computer readable storage medium of claim 11, wherein the instructions, when executed, cause the computing device to:

receive a transmission from a second robot that indicates positions of the second robot; and compute at least one of the robot congestion measurements based on the positions of the second robot.

13. The at least one non-transitory computer readable storage medium of claim 8, wherein to determine the cost for each respective path of the paths, the instructions, when executed, cause the computing device to determine the cost based on a length of the respective path in the abstract state.

14. The at least one non-transitory computer readable storage medium of claim 8, wherein the instructions, when executed, cause the computing device to:

move the first robot along the selected path based on the motion plan.

15. A method comprising:

determining paths in abstract states for a first robot to traverse between an origin and a destination;

determining a cost for each respective path of the paths by normalizing a congestion measurement of a respective abstract state of the abstract states forming the respective path based on a size of the respective abstract state;

selecting a selected path from the paths that is associated with a lowest cost from the costs; and computing a motion plan for the first robot to traverse the selected path.

16. The method of claim 15, wherein each of the congestion measurements includes a human congestion measurement of the respective path.

17. The method of claim 16, further comprising:

receiving a transmission from a second robot that indicates positions of humans; and computing at least one of the human congestion measurements based on the positions of the humans.

18. The method of claim 15, wherein each of the congestion measurements includes a robot congestion measurement of the respective path.

19. The method of claim 18, wherein the method further comprises:

receiving a transmission from a second robot that indicates positions of the second robot; and computing at least one of the robot congestion measurements based on the positions of the second robot.

20. The method of claim 15, wherein:

the determining the cost for each respective path of the paths includes determining the cost based on a length of the respective path in the abstract state; and the method further comprises moving the first robot along the selected path based on the motion plan.

* * * * *